March 23, 1965
F. J. LUCARELLI
3,174,365
CHUCK KEY HOLDER
Filed Sept. 17, 1962
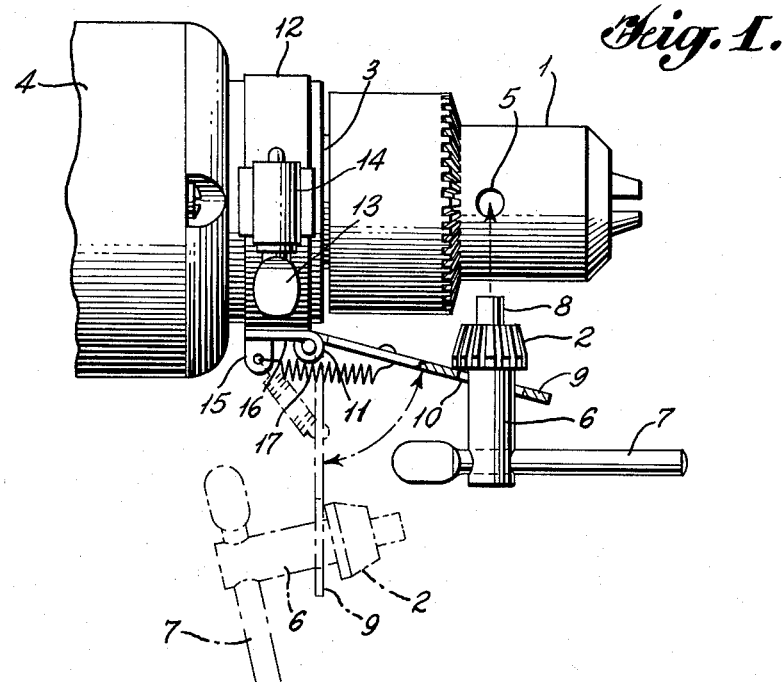
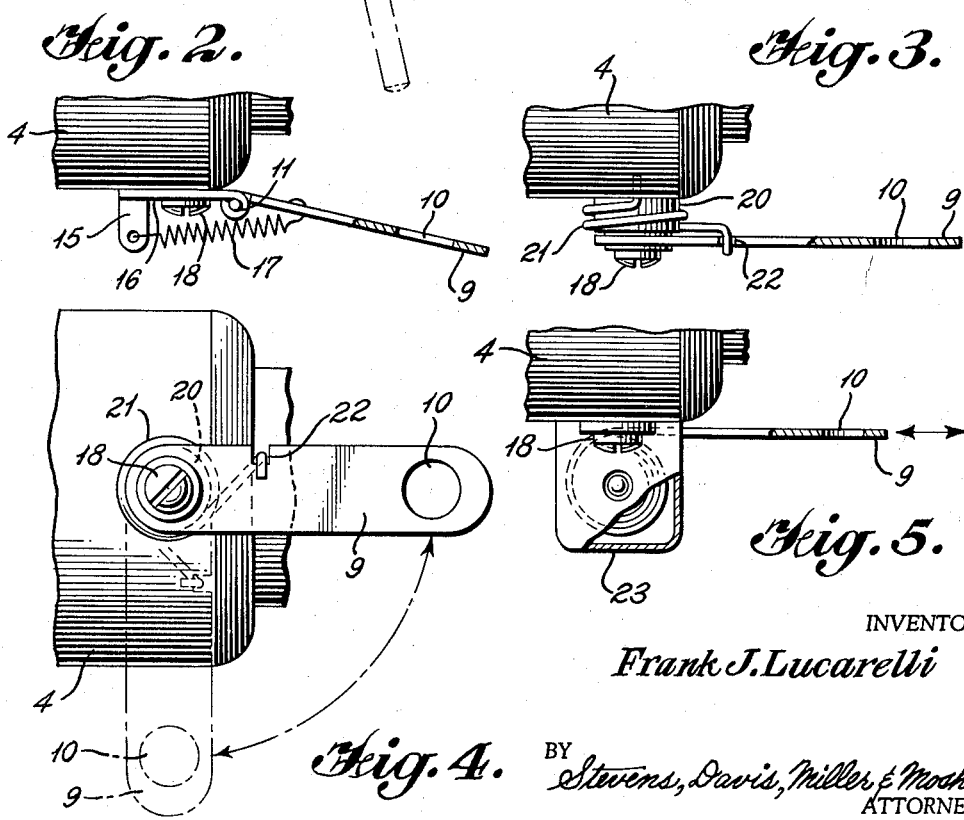
INVENTOR
Frank J. Lucarelli
BY Stevens, Davis, Miller & Mosher
ATTORNEYS United States Patent Office 3,174,365
Patented Mar. 23, 1965

3,174,365
CHUCK KEY HOLDER
Frank J. Lucarelli, Middleborough, Md.
(203 Nanticoke Road, Baltimore 21, Md.)
Filed Sept. 17, 1962, Ser. No. 224,032
5 Claims. (Cl. 77—55)

This invention relates to a chuck key holder particularly adapted for holding the key of a standard, conventional Jacobs chuck of a hand-drill motor.

It is well known that the key of the Jacobs chuck is a difficult thing to keep track of between uses of it to change drills in the chuck.

It is an object of this invention to provide a key holder for the key of the Jacobs chuck that will be secured to the housing of the drill motor in a way that it will be available for use changing drills in the chuck but that it will also be out of the way and not interfere with the work being done by the hand-drill.

It is another object of this invention to afford several ways of attaching such a key holder to the housing of a drill motor so that the key retaining member will be located to accomplish the primary purpose of making the chuck key available for changing drills in the Jacobs chuck.

Further and other objects will be apparent from the description of the invention as shown in the accompanying drawings in which like numerals refer to like parts.

In the drawings:

FIGURE 1 shows the key holding member attached to the housing of a drill motor.

FIGURE 2 shows another way of attaching the key holding member to the housing of a drill motor.

FIGURES 3 and 4 show another way of attaching the key holding member to the housing of a drill motor.

FIGURE 5 shows a further way of retaining the key on the motor housing.

FIGURE 1 illustrates a conventional Jacobs chuck 1 having the hole 5 formed in the side of the chuck to permit the use of a Jacobs chuck key 2, to actuate the chuck for changing drills. Jacobs chuck 1 is mounted to turn relative to drive shaft 3 when drills are to be inserted or removed from the chuck. Drive shaft 3 is turned by a motor housed in housing 4 in a conventional manner. Jacobs chuck key 2 has a shaft 6 and a handle 7 completing the Jacobs chuck key. Shaft 8 of the chuck key fits in hole 5 of the chuck to permit the teeth of key 2 to engage the teeth of chuck 1 to actuate the chuck when drills are to be changed.

Chuck key holder 9 is an elongated piece of metal having a hole formed therein which fits very loosely around shaft 6 of chuck key 2. The other end of metal strip 9 is hinged at 11 to a bracket 16 secured to band 12. Band 12 is capable of having its circumferential length elongated or shortened by a mechanism shown with a thumb screw 13 and a worming gear 14 to serve to clamp member 12 around a portion of the housing of the drill motor. Spring 17 is secured at one end to member 15 and the other end to an intermediate point of member 9.

It will be seen, therefore, that member 9 is biased away from chuck 1 by spring 17 under normal conditions. However, it is possible to move member 9 and chuck key 2 into position adjacent chuck 1 and insert shaft extension 8 into hole 5 of chuck 1 for manipulating the chuck to change a drill. When this operation is finished, the spring 17 will pull member 9 and chuck key 2 with it, away from the chuck so there will be no danger to the operator of the chuck key rotating with the chuck.

In FIGURE 2 a similar arrangement is shown for a chuck key holder 9 biased by spring 17, but the end 16 is secured to housing 4 by means of screw 18. This screw can be any convenient screw that is normally found in the assembly of a drill motor or it can be a screw specially tapped into the housing adjacent the forward end of the drill motor for the purpose of mounting the chuck key retainer.

FIGURES 3 and 4 show the chuck key retainer 9 having hole 10 in the end thereof mounted for rotation on a bracket 20 held in position on housing 4 by screw 18. The member 9 in this illustration pivots around the axis of screw 18 in a plane parallel to the axis of rotation of the shaft and chuck of the motor. A coil spring like a watch spring 21 is mounted on bracket 20 and has one end secured thereto while the other end is secured in slot 22 on member 9 to bias member 9 away from a position adjacent chuck 1. The chuck key extends through hole 10 as described above, but when its operation has been completed and the key released, member 9 will be rotated by the action of spring 21 to a position away from the chuck. Stops may be provided for holding member 9 in a 90° or 180° position away from the operative position at the chuck.

FIGURE 5 shows member 9 having a hole 10 formed therein consisting of a steel tape housed in housing 23. It is secured to drill motor housing 4 by a bolt 18. Housing 23 has a steel tape normally coiled within it, but it may be extended to a position such that member 9 having hole 10 formed therein can accommodate a chuck key. Member 9 may be pulled from the coil position within housing 23 until the chuck key is adjacent the hole in chuck 1 for manipulating the jaws of the chuck for inserting and removing a drill. When this operation is complete, the chuck key will be released and member 9 will be retracted within housing 23, away from possible interference with chuck 1.

The operation of the device for holding a chuck key is essentially the same in all of the foregoing embodiments. The chuck key holder for the key of the Jacobs chuck is mounted in a member which can be extended against a spring load to a position where the chuck key may be used to manipulate a chuck and when this operation is complete, the chuck key holder will be removed from a position of proximity to the chuck to a position of safety so that it will not interfere with the operation of the chuck and cannot be inadvertently left in the chuck when power has been turned on and the chuck rotated.

It is to be understood that certain changes, alterations, modifications, and substitutions may be made without departing from the spirit and scope of the depending claims.

What is claimed is:

1. A chuck key holder for a Jacobs chuck which is mounted on the drive shaft of a drill motor relative to the housing thereof, and is of the type having an annular bevel gear surrounding the chuck and a plurality of chuck key holes on the periphery of the chuck to support the end of the shaft of the key in the operative position, said chuck key holder comprising a chuck key supporting member, one end of which is movably secured to the motor housing and the other end having a chuck key hole to surround and retain the shaft of the key formed therein, the length of said supporting member being such as to position the chuck key supporting hole approximately aligned with the chuck key shaft end supporting hole in the chuck, and resilient means to bias said supporting member away from the chuck.

2. A chuck key holder for a Jacobs chuck which is mounted to turn on a shaft in a drill motor relative to the housing thereof comprising an annular metal clamp member of the thumb screw type for mounting said holder on said motor housing, means for varying the circumferential length of said annular metal clamp member to fit around a portion of the housing adjacent the chuck, a strip member hinged at one end to said annular metal clamp member, the other end of said strip member having a hole formed therein to loosely engage the shank of a Jacobs chuck key, the length of said strip member being such as to position the hole formed therein for the chuck key shank adjacent the chuck key hole in the Jacobs chuck, and spring means to bias said strip means away from said chuck.

3. A chuck key holder for a Jacobs chuck which is mounted to turn on the drive shaft of a drill motor relative to the housing thereof, comprising a mounting bracket secured by a screw to the drill motor housing, an elongated member for supporting the shaft of a chuck key having the one end secured to said bracket and the other end of said elongated member formed with a hole to loosely engage the shaft of the chuck key, the latter end of said elongated member being capable of moving toward and away from said chuck and being of such length as to position said hole formed in the end thereof approximately over the chuck key hole in said chuck, and means to bias said latter end of said elongated member away from said chuck.

4. A chuck key holder for a Jacobs chuck which is mounted to turn on a shaft in a drill relative to the housing thereof, comprising a bracket member secured by a screw to the drill motor housing, an elongated member mounted on said bracket member for piovtal motion about one end thereof secured to said bracket member in a plane parallel to the axis of the shaft of the drill motor, the other end formed with a hole to loosely engage the shaft of a chuck key, said elongated member being of such a length as to approximately position the hole formed in the end thereof over the chuck key hole in a Jacobs chuck and spring means to bias the latter end of said elongated member away from said chuck.

5. A chuck key holder for a Jacobs chuck which is mounted to turn on a shaft in a drill motor relative to the housing thereof comprising a bracket member secured by a screw to the drill motor housing, a housing secured to said bracket, said housing having a resilient, extensible metal tape member normally coiled within said housing, the outer end of said tape member having a hole formed therein to loosely engage the shank of a Jacobs chuck key whereby the outer end of said metal tape member will be normally positioned adjacent the housing but may be extended to the Jacobs chuck.

References Cited by the Examiner
UNITED STATES PATENTS

| | | |
|---|---|---|
| 1,268,458 | 6/18 | Hellgren. |
| 2,396,922 | 3/46 | Magnenat. |
| 2,713,407 | 7/55 | Miller. |
| 2,807,732 | 9/57 | Kurtovich _____ 77—64 |

WILLIAM W. DYER, JR., *Primary Examiner.*

JOHN C. CHRISTIE, *Examiner.*